United States Patent [19]

Behrens et al.

[11] Patent Number: 4,665,409

[45] Date of Patent: May 12, 1987

[54] WRITE HEAD FOR INK PRINTER DEVICES

[75] Inventors: Martin Behrens, Munich; Ingolf Depta, Petershausen; Günter Rosenstock, Ottobrunn, all of Fed. Rep. of Germany

[73] Assignee: Siemens Aktiengesellschaft, Munich and Berlin, Fed. Rep. of Germany

[21] Appl. No.: 798,306

[22] Filed: Nov. 15, 1985

[30] Foreign Application Priority Data

Nov. 29, 1984 [DE] Fed. Rep. of Germany ....... 3443579

[51] Int. Cl.[4] .......... G01D 15/18
[52] U.S. Cl. .......... 346/140 R
[58] Field of Search .......... 346/140, 75

[56] References Cited

U.S. PATENT DOCUMENTS

| | | | |
|---|---|---|---|
| 4,158,847 | 6/1979 | Heinzl et al. | 346/140 R |
| 4,418,356 | 11/1983 | Reece | 346/140 |
| 4,485,386 | 11/1984 | Dagna | 346/140 X |
| 4,504,845 | 3/1985 | Kattner et al. | 346/140 R |

FOREIGN PATENT DOCUMENTS

| | | |
|---|---|---|
| 55-101466 | 8/1980 | Japan . |
| 55-117666 | 9/1980 | Japan . |
| 55-130783 | 10/1980 | Japan . |

OTHER PUBLICATIONS

Durbeck et al., Drop-On-Demand Nozzle Arrays with H.F. Response, vol. 21, No. 3, Aug. 1978, pp. 1210-11.

*Primary Examiner*—Joseph W. Hartary
*Attorney, Agent, or Firm*—Hill, Van Santen, Steadman & Simpson

[57] ABSTRACT

The invention relates to a write head for ink printer devices comprising tubular ink channels which are surrounded over a part of their length by individually drivable small piezo tubes and which are situated proceeding between an ink supply part and the discharge openings of the write head. The ink channels applied to a carrier part form a pre-fabricatable channel block together with this carrier part. A channel plate is secured either to that side at which the ink channels end free or to the back surface of the carrier part. In one embodiment, the channel plate comprises a layer plate having through holes into which the free ends of the ink channels equipped with the small piezo tubes are pluggable. Transition channels for guiding the ink flow and the discharge openings of the write head for fashioned in further layer plates of the channel plate.

9 Claims, 13 Drawing Figures

WRITE HEAD FOR INK PRINTER DEVICES

BACKGROUND OF THE INVENTION

1. Field of the Invention

The invention relates to a write head for ink printer devices and more particularly to a write head having tubular ink channels which have one end connected to an ink supply system and are in communication at their other end with the discharge openings of nozzle shoe of the write head and which are surrounded over a part of their length by individually drivable small piezo tubes under whose influence a drop-by-drop ejection of ink ensues.

2. Description of the Prior Art

It is known (German Pat. No. 2 543 451) in the construction of write heads for ink printer devices to cast a pre-assembled unit containing forming needles and tubular piezo elements, whereby the ink channels arise in the write head after the removal of the forming needles. The ink channels are closed with a nozzle shoe at their end facing the write location. At the other end of the ink channels, these ink channels are in communication with an ink supply system. The manufacturing outlay connected with such a construction is relatively high and requires a high degree of manual activity. In particular, the observation of extremely tight tolerances raises high demands, this frequently leading to involved after-treatment or reworking of the individual parts.

In order to reduce this outlay, it is also known (German OS No. 3 234 408) to combine the ink channels and the small piezo tubes allocated to them to form what is referred to as a piezo tube group. The ink channels are thereby arranged fan-shaped and, proceeding from a common web, proceed converging toward the front, where they are combined in a front, conical surface. The manufacture of such a piezo tube group is not simple, particularly because of the very narrow division of the ink channels at the front region; further, a considerable outlay is also required for adjusting the small piezo tubes which are also integrated into the unit.

SUMMARY OF THE INVENTION

An object of the invention is to create a write head for ink printer devices in the construction whereof few discrete parts, manufacturable with low outlay, are required, these being capable of being assembled by means of simple assembly operations without additional re-working of the individual parts and this write head guaranteeing high functional reliability during operation.

This object is achieved by providing that the ink channels be fashioned as small tubes proceeding in parallel which are combined at one side at a common, plate-shaped carrier part and form what is referred to as a channel block together with the carrier part. The free ends of the ink channels are plugged into through holes of a plate-shaped retaining part after the free ends have been equipped with small piezo tubes. A channel plate is secured to one side of the channel block and is composed of at least one part which comprises the discharge openings in a division grid provided for the write mode.

The unit provided for the inventive formation of the write head and referred to as the channel block comprising the ink channels proceeding parallel to one another which are situated at a common carrier part, can be manufactured in a simple way, for example as an injected plastic part. Equipping this unit with the small piezo tubes is accomplished by means of simple plugging onto the ink channels which proceed in parallel over their entire length. The contacting occurs with contact elements of a contact means preferably formed as a plastic plate having interconnects. The channel plate secured to one side of the channel block, as well as the plate-shaped retaining part provided in an exemplary embodiment, can also be preferably pre-fabricated as an injected part and can be mounted in a simple way. The overall unit, finally, can be completely or partially cast out.

In one embodiment of the invention, the channel plate represents the front termination of the write head which faces the write location. At the same time, it also serves as a plate-shaped retaining part for the acceptance of the free ends of the ink channels. In this case, the ink feed ensues via the openings in the carrier part. In accord with another embodiment, the channel plate is secured gap-free and ink-tight to the back surface of the carrier part. In this case, the plate-shaped retaining part is additionally provided for the pluggable acceptance of the free ends of the ink channels via which the ink feed then also ensues.

BRIEF DESCRIPTION OF THE DRAWINGS

Details of the invention shall be set forth in greater detail below with reference to the drawings. Shown therein are

DESCRIPTION OF THE PREFERRED EMBODIMENTS

Figure 1:
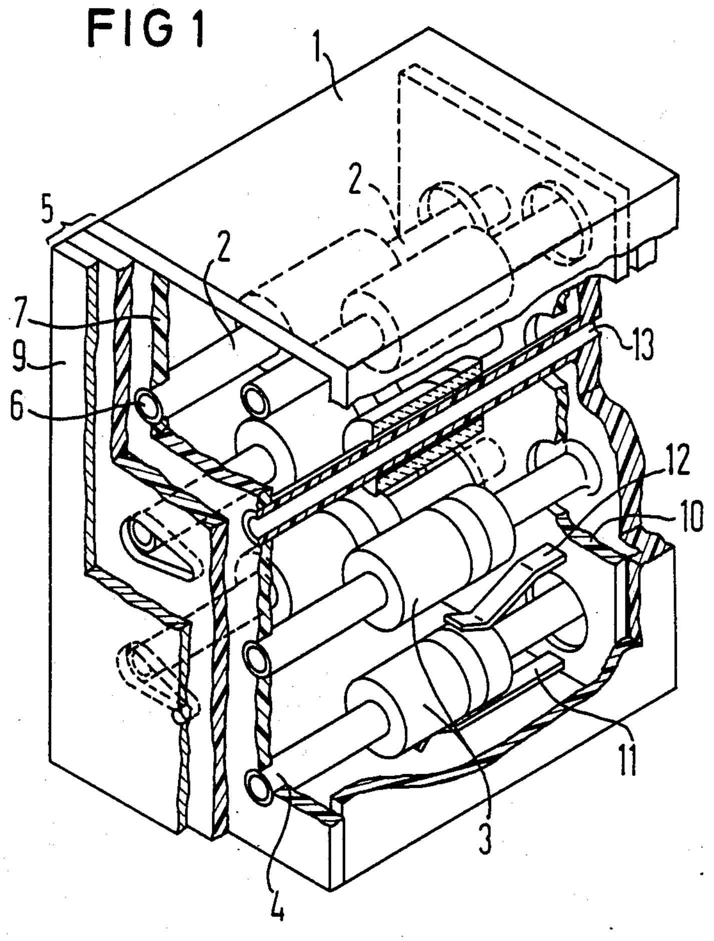
FIG. 1 is a perspective view, partially cut away, illustrating the structure of the write head embodying the principles of the present invention.

The exemplary embodiment of FIG. 1 shows a perspective view of the essential parts of a write head necessary for an understanding of the invention. The arrangement shows a channel block which is composed of a carrier part 1 to which tubular ink channels 2 are attached. The carrier part can thereby be manufactured as an injected plastic part which can be cost-favorably manufactured as a unit in a simple way involving little outlay. The ink channels 2 are parallel and end at the back side of the carrier part 1 in openings 13. Ends 4 of the ink channels 2 are open and free at the other side, directed forward in the figure. This channel block is equipped with small piezo tubes 3. This occurs by plugging the small piezo tubes 3 onto the ink channels 2 and a glue can be employed for fastening. It is advantageous for contacting the small piezo tubes 3 which, as known, are provided with an inside and an outside contact layer, to provide a contact device 10 formed, for example, as a plastic plate and provided with interconnects whose contact elements, contact springs 11 and 12 in the example, contact the contact layers when plugged onto the small piezo tubes 3.

A plate-shaped retaining part is provided for the acceptance of the front, free ends 4 of the ink channels 2. In the exemplary embodiment of FIG. 1, this retaining part is formed as a channel plate 5 which comprises correspondingly shaped and situated holes 6 in a layer plate 7 at that side facing the ink channels 2. The free ends 4 of the ink channels 2 are plugged into these holes 6. The channel plate 5 includes ink discharge openings at that side facing the write location, the spacing of these ink discharge openings corresponding to the division grid provided for the write mode. This part of the channel plate, namely a layer plate 9, thus corresponds to a nozzle shoe. Since the division grid is usually narrower than the arrangement of the ink channels 2 in the channel block, a deflection for the ink flow is to be provided between the acceptance openings 6 for the ink channels and the discharge openings in the layer plate 9. In the exemplary embodiment, transition channels are situated for this purpose in a middle layer plate 8 of the channel plate 5. A three-layer plate is employed as channel plate 5 in the exemplary embodiment shown here, the pluggable acceptance of the free ends 4 of the ink channels 2 being fashioned in a first layer plate 7 thereof, the transition channels for guiding the ink flow being fashioned in a second layer plate 8 thereof and the discharge openings of the write head being fashioned in a third layer plate 9 thereof. Details in this regard are set forth below with reference to FIGS. 2 through 5.

The write head constructed in the described fashion can be subsequently either entirely or partially cast out with, for example, casting resin. A complete casting-out has the advantage that a good damping of the write head is therewith achieved. A significant reduction of what are referred to as cross-talk effects as well as an increase in what is referred to as the spraying frequency are connected therewith. A partial casting-out can be adequate for write heads wherein these demands are not particularly prominent, whereby a noticeable reduction in weight of the write head is achieved, this also having a favorable influence in view of the operation thereof and the speed with which the write head is moved. In any case, the construction of a write head embodying the principles of the present invention does not require any re-working of the individual parts. On the contrary, these can be pre-fabricated with low outlay and can be assembled without observing special tolerance conditions.

Figure 2:
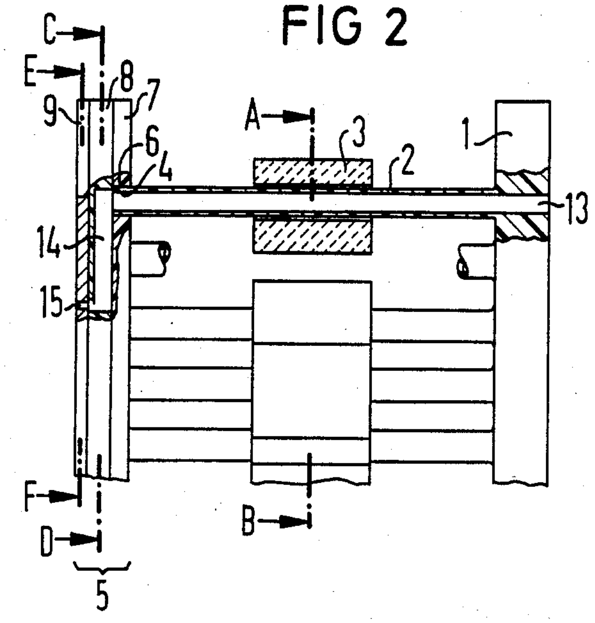
FIG. 2 is a side elevational view of the write head of FIG. 1.

FIG. 2 shows a sectional view of the write head structure of FIG. 1. Proceeding from the carrier part 1, the ink channels 2 extend toward the front with their free ends 4 proceeding in parallel. They are surrounded over a part of their length by the small piezo tubes 3 plugged onto them. The front, free ends 4 of the ink channels 2 are plugged into the openings 6 of the first layer plate 7 of the channel plate 5 and are thus fixed. The middle layer plate 8 comprises recesses 14 via which a deflection and guidance of the ink flow between the ink channels 2 and the discharge openings 15 in the third layer plate 9 occur. Based on its function, the third layer plate 9 can also be referred to as a nozzle shoe. In the example of FIG. 2, the contacting elements have no longer been shown. It can be seen, however, without further ado that a contacting described with reference to FIG. 1 can be provided and that, when an individual small piezo tube is selected with a correspondingly polarized pulse in a known fashion, this, by changing its inside diameter, generates a pressure pulse or a pressure wave in the inside of the corresponding ink channel which propagates toward both sides and that an individual droplet is ejected via the discharge opening 15 allocated to this ink channel.

Figure 3:
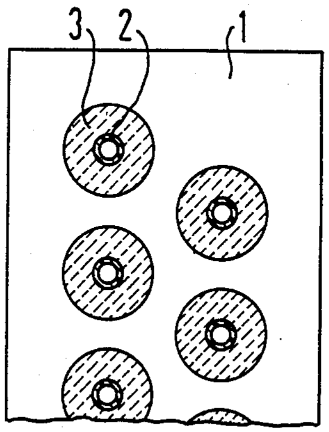
FIG. 3 is a sectional view taken generally along the line A–B of FIG. 2.

In the example, as shown in FIG. 3 the ink channels 2 applied at the carrier part 1 are situated in two rows offset relative to one another. They can be situated at such a mutual spacing that a manual or automatic equipping with the small piezo tubes can ensue problem-free.

Figure 5:
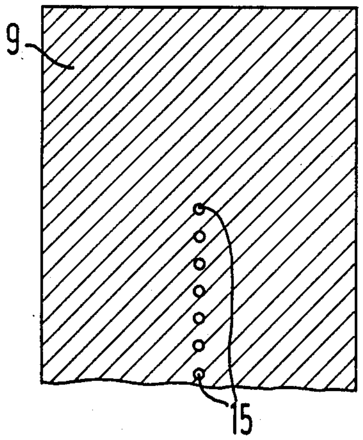
FIG. 5 is a sectional view taken generally along the line E–F of FIG. 2.
Figure 4:
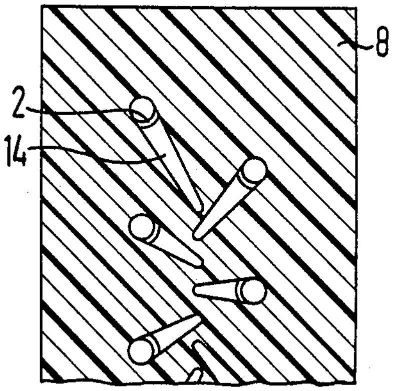
FIG. 4 is a sectional view taken generally along the line C–D of FIG. 2.

FIGS. 4 and 5 show details of the channel plate 5, a section through the second layer plate 7 and through the third layer plate 9 being respectively shown in these figures. The transition channels 14 proceed in the middle or second layer plate 8 shown in FIG. 4, these transition channels 14 guiding the ink flow between the ink channels 2 ending at the first layer plate 7 and the discharge openings 15 situated in the third layer plate 9. The transition channels 14 can be fashioned as recesses in the second layer plate 8. The third layer plate 9 shown in FIG. 5 contains the discharge openings 15 arranged in the division grid provided for the write mode, these discharge openings forming a row in the example. The channel plate 5 can be constructed of ceramic, of metal or of plastic, whereby what is referred to as the ultrasound welding method can be applied particularly for joining plates manufactured of plastic.

The ink feed of the write head of the exemplary embodiment ensues via the openings 13 in the carrier part 1 of the channel block. In a fashion not shown here, these openings 13 are connected to an ink supply shared by all ink channels 2 or by a defined number of ink channels and this ink supply is in turn connected to an ink reservoir from which the ink quantity required during operation of the write head used due to the droplet ejection is replenished by suction under the influence of the small piezo tubes.

Figure 6:
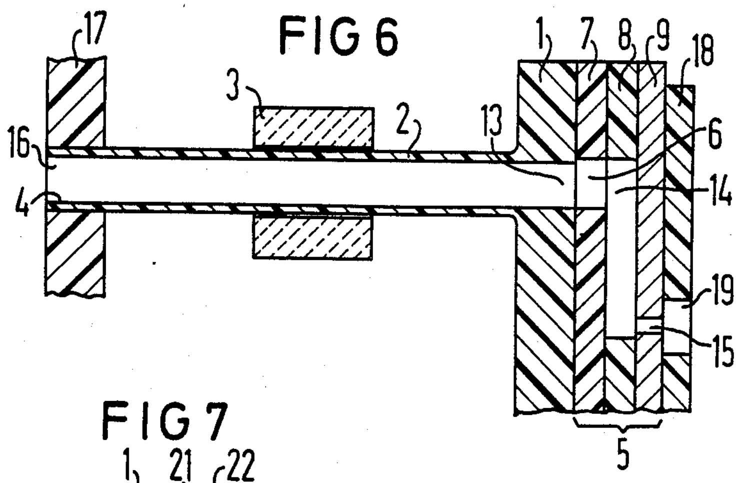
FIG. 6 is a sectional view of an embodiment of the invention wherein the channel plate is secured to the back surface of the retaining part.

In the described exemplary embodiment, it has been assumed that the free ends of the ink channels terminate with the channel plate. In the framework of the invention, however, it is also possible to situate the channel plate at the back surface of the carrier part, i.e. at the planar surface of the channel block. FIG. 6 shows an example of this. The channel block is again composed of the carrier part 1 and the ink channels 2 applied thereto which proceed in a parallel arrangement. After the insertion of a contacting device (not shown here), the small piezo tubes 3 are plugged onto the ink channels 2, are secured there and contacted. The channel plate 5, whose format can correspond to that of the composite plate described above, is secured here to the back wall of the carrier part 1 of the channel block in a gap-free and ink-tight fashion. The free ends 4 of the ink channels 2 are plugged into openings 16 of a plate-shaped retaining element 17 which is referred to as a cover plate. The ink feed system is connected via this cover plate 17, this ink supply system being shared by all ink channels 2 in this case. The connection between the ink channels 2 and the ink supply, which is not shown here, is made via the openings 16 in the cover plate 17. It is advantageous in order to increase the stability of the overall arrangement to provide an additional supporting plate 18 at the front surface of the write head, this supporting plate 18 comprising a corresponding recess 19 in the region of the discharge openings 15. As already specified with reference to FIG. 1, the overall arrangement can be completely or partially cast out.

As set forth below with reference to some exemplary embodiments, a double layer or single layer plate can also be employed as the channel plate, whereby various possiblities are available for the formation of the transition channels.

Figure 7:
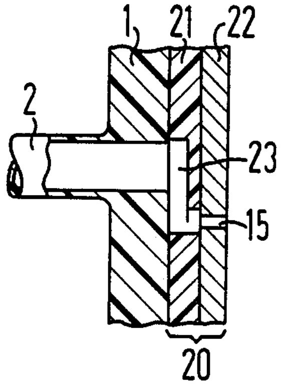
FIG. 7 is a partial sectional view of a double layer channel plate.
Figure 8:
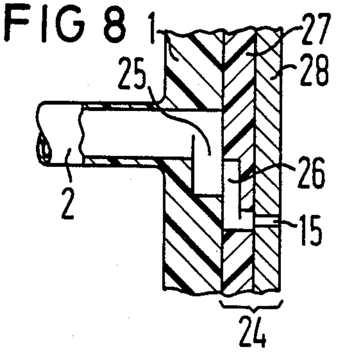
FIG. 8 is a partial sectional view of an alternate embodiment of a double layer channel plate.

Given employment of a double layer plate as shown in the embodiment of FIG. 7, the transition channels 23 can be exclusively fashioned in the layer plate 21 of the channel plate 20 adjacent to the carrier part 1, or, as shown in the embodiment of FIG. 8, a channel plate 24 can be provided in which one part 25 of the transition channel is fashioned in the carrier part 1 and a second part 26 are fashioned in the first layer plate 27. In both instances, the discharge openings 15 are fashioned in the second layer plate 22 (FIG. 7) or 28 (FIG. 8) in accord with the division provided for the write mode.

Figure 9:
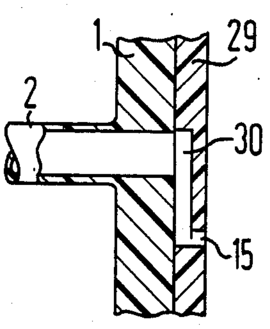
FIG. 9 is a partial sectional view of a single layer channel plate.
Figure 10:
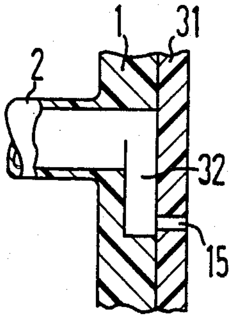
FIG. 10 is a partial sectional view of an alternate embodiment of a single layer channel plate.

Given employment of a single layer plate as shown in the exemplary embodiment of FIG. 9, the transition channels 30 and the discharge openings 15 can be arranged in the channel plate 29. However, as shown in FIG. 10, it is also possible to fashion transition channels 32 in the carrier part 1 and to provide a channel plate 31 which only contains the discharge openings 15.

Figure 11:
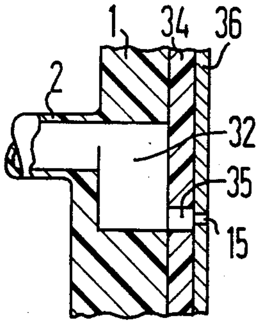
FIG. 11 is a partial sectional view of a double layer channel plate with a removable layer.

As shown in FIG. 11, it can be advantageous in a further development given ink channels 2 situated in the carrier part 1, to employ two plates 34, 36 having openings differing in size which, moreover, can also be composed of differing materials, whereby there is the possibility that the plate 36 corresponding to a nozzle shoe is not rigidly connected and can be removed.

Figure 12:
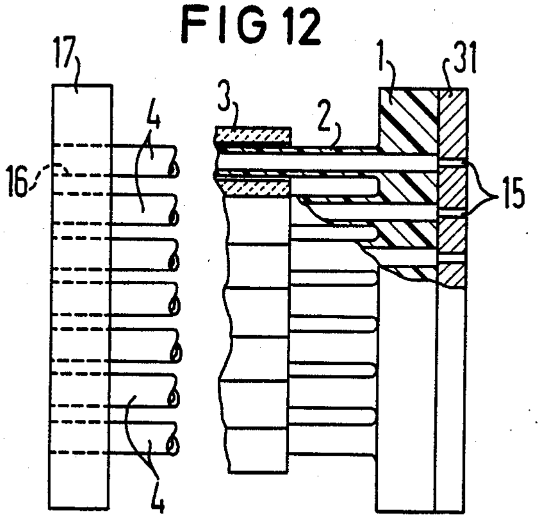
FIG. 12 is a side elevational view partially cut away of the channel block and channel plate.
Figure 13:
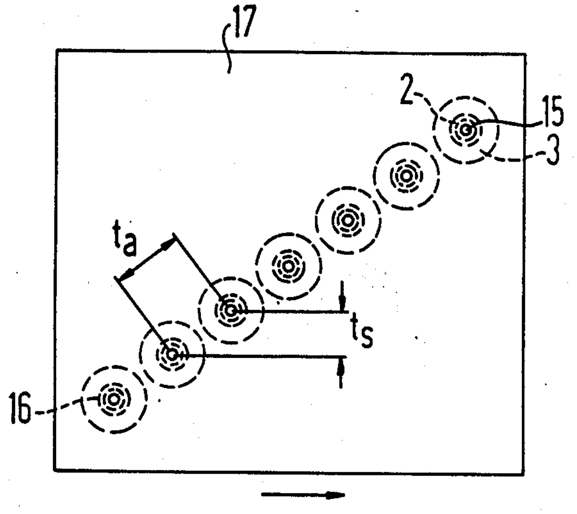
FIG. 13 is an end elevational view of the channel block of FIG. 12.

Also lying within the framework of the invention, finally, is to fashion the channel block and the channel plate such that the discharge openings immediately follow the ink channels. FIGS. 12 and 13 shown an example of this. Again, the ink channels 2 and the carrier part 1 form the unit channel block which can be produced as a pre-fabricated unit. Here, the ink channels 2 are situated along an oblique line with a division spacing ta defined by the spacing of the small piezo tubes 3. The free ends 4 of the ink channels 2 are plugged into the through openings 16 of the plate-shaped retaining part 17. The connection to the ink supply system is also located at this side. The channel plate 31 secured to the back surface of the carrier part 1 represent that end of the write head facing the write location. The channel plate 31 comprises the discharge openings 15 worked in accord with the position of the ink channels 2, i.e. likewise situated along an oblique line, so that a division spacing ts of the discharge openings 15 derives in vertical direction which is smaller than the division spacing ta of the ink channels. A transition channel is no longer necessary given this embodiment. As known per se, the representation of characters in the write mode ensues in such fashion in this case that the write head is moved in arrow direction (FIG. 13), whereby the height of the printed characters is defined by the inclination of the discharge openings 15 situated along an oblique line.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A write head for the ink printing devices having tubular ink channels which have one end connected to an ink supply system and which are in communication at their other end with the discharge openings of a nozzle plate of the write head and which are surrounded over a part of their lengths by individually drivable small piezo tubes under whose influence a drop-by-drop ejection of ink ensues, wherein said ink channels are fashioned as small tubes proceeding in parallel which are combined at one end at a plate-shaped retaining part, and whereby a channel is provided within the plate, this channel plate being composed of at least one part which includes the discharge openings in a division grid provided for the write mode, comprising the improvement that the small tubes are combined at one side with a common plate-shaped carrier part and form a one-piece channel block together with the carrier part, the channel plate being secured gap-free to the back surface of the carrier part and the free ends of the ink channels being pluggably held in through holes of the plate-shaped retaining part, and a plurality of transfer channels being provided between the ink channels and the carrier plate and the discharge openings of the channel plate in said carrier part.

2. A write head according to claim 1, wherein said channel plate is a multi-layer plate; a first layer plate adjacent to said carrier part containing through holes having a shape and arrangement correspond to said openings of said ink channels at said back surface of said carrier part; a second layer plate containing said transition channels for conducting said ink flow and a third layer plate containing said discharge openings in said division grid provided for said write mode.

3. A write head according to claim 1, wherein said channel plate is a double layer plate having a first layer plate adjacent to said carrier part which contains said transition channels for guiding said ink flow and whereof a second layer plate which contains said discharge openings.

4. A write head according to claim 1, wherein said channel plate is a double layer plate; a first part of said transition channels is fashioned in said carrier part and a second part of said transition channels is fashioned in a first layer plate of said channel plate, said first layer plate being adjacent to said carrier part.

5. A write head according to claim 1, wherein said channel plate is a single layer plate in which said transition channels and said discharge openings are fashioned.

6. A write head according to claim 1, wherein said channel plate is a single layer plate in which said discharge openings are formed; and wherein said transition channels are formed in said carrier part.

7. A write head according to claim 6, wherein said channel plate is formed as a single layer plate containing through openings whose diameters are greater than the diameters of said discharge openings and which are covered by a cover plate in which said discharge openings lie; and said cover plate is secured in releasable fashion.

8. A write head according to claim 1, wherein said channel plate is a single layer plate which is secured to said back surface of said carrier part in a gap-free fashion and said free ends of said ink channels are held in through holes of said plate-shaped retaining part in pluggable fashion; said ink channels proceed parallel to one another and are arranged along an oblique line having a division spacing defined by the spacing of said small piezo tubes; and said discharge openings of said channel plate are immediately allocated to said ink channels, whereby the division spacing of said discharge openings is smaller than the division spacing of said ink channels.

9. A write head according to claim 1, wherein said channel plate is outwardly covered by an additional reinforcing plate which contains a recess in the region of said discharge openings.

* * * * *